(12) United States Patent
Kawasaki et al.

(10) Patent No.: US 10,088,291 B2
(45) Date of Patent: Oct. 2, 2018

(54) INSTANTANEOUS PHASE-SHIFT INTERFEROMETER

(71) Applicant: MITUTOYO CORPORATION, Kanagawa (JP)

(72) Inventors: Kazuhiko Kawasaki, Ushiku (JP); Shinpei Matsuura, Tsukuba (JP)

(73) Assignee: MITUTOYO CORPORATION, Kanagawa (JP)

( * ) Notice: Subject to any disclaimer, the term of this patent is extended or adjusted under 35 U.S.C. 154(b) by 5 days.

(21) Appl. No.: 15/190,912

(22) Filed: Jun. 23, 2016

(65) Prior Publication Data
US 2017/0016711 A1 Jan. 19, 2017

(30) Foreign Application Priority Data
Jul. 14, 2015 (JP) .................................. 2015-140397

(51) Int. Cl.
G01B 9/02 (2006.01)
G01B 11/24 (2006.01)

(52) U.S. Cl.
CPC .............. *G01B 9/0201* (2013.01); *G01B 9/02* (2013.01); *G01B 9/02027* (2013.01);
(Continued)

(58) Field of Classification Search
CPC .............. G01B 9/0201; G01B 11/2441; G01B 9/02027; G01B 11/24; G01B 9/02; G01B 2290/70
See application file for complete search history.

(56) References Cited

U.S. PATENT DOCUMENTS

| 8,345,258 B2 * | 1/2013 | Millerd .............. G01B 9/02045 356/492 |
| 8,368,900 B2 | 2/2013 | Kawasaki et al. |

(Continued)

FOREIGN PATENT DOCUMENTS

| JP | 2002-013907 A | 1/2002 |
| JP | 2002-013919 A | 1/2002 |

OTHER PUBLICATIONS

R. Smythe et al, "Instantaneous Phase Measuring Interferometry", Optical Engineering., vol. 23, No. 4, Aug. 1, 1984, XP055317114.
(Continued)

*Primary Examiner* — Hwa Lee
(74) *Attorney, Agent, or Firm* — Greenblum & Bernstein, P.L.C.

(57) ABSTRACT

An instantaneous phase-shift interferometer uses a light source having a coherence length shorter than a difference in optical path length between the light reflected from a reference surface and the light reflected from a measured surface. A beam from the light source is split and, using an adjustable delay optical path, a first beam is delayed to cause a difference in optical path length and is superimposed on the same optical axis as a second beam, after which the reference beam and the measurement beam are generated. The optical path length of the delay optical path is changed during adjustment, a plurality of interference fringe images are individually captured, and at least one of a bias, amplitude, and phase shift amount of the interference fringes obtained in each of the interference fringe images is calculated. A shape of a measured object is measured based on bias calculation results, amplitude calculation results, and phase shift amount calculation results.

5 Claims, 5 Drawing Sheets

(52) U.S. Cl.
CPC .......... *G01B 11/24* (2013.01); *G01B 11/2441* (2013.01); *G01B 2290/70* (2013.01)

(56) References Cited

U.S. PATENT DOCUMENTS

| | | |
|---|---|---|
| 9,115,973 B2 | 8/2015 | Suzuki et al. |
| 2003/0137671 A1* | 7/2003 | De Groot ........... G01B 9/02057 356/512 |
| 2005/0046864 A1 | 3/2005 | Millerd et al. |
| 2005/0046865 A1* | 3/2005 | Brock ................ G01B 9/02057 356/495 |
| 2010/0134801 A1 | 6/2010 | Millerd et al. |
| 2012/0188555 A1 | 7/2012 | Izatt et al. |
| 2014/0362383 A1 | 12/2014 | Haitjema et al. |
| 2016/0131474 A1 | 5/2016 | Saeki et al. |

OTHER PUBLICATIONS

Ngoi B K A et al, "Instantaneous phase shifting arrangement for microsurface profiling of flat surfaces", Optics Communications, North-Holland Publishing Co. Amsterdam, NL, vol. 190, No. 1-6, Apr. 1, 2001, XP004233760, pp. 109-116.
Search Report issued in European Patent Office (EPO) Patent Application No. 16001456.9, dated Nov. 23, 2016.

\* cited by examiner

PRIOR ART

INSTANTANEOUS PHASE-SHIFT INTERFEROMETER

CROSS-REFERENCE TO RELATED APPLICATIONS

The present application claims priority under 35 U.S.C. § 119 of Japanese Application No. 2015-140397, filed on Jul. 14, 2015, the disclosure of which is expressly incorporated by reference herein in its entirety.

BACKGROUND OF THE INVENTION

1. Field of the Invention

The present invention relates to an instantaneous phase-shift interferometer. In particular, the present invention relates to an instantaneous phase-shift interferometer being proposed to improve accuracy, enabling a user to easily pre-measure (calibrate) a bias, amplitude, and amount of phase shift between a plurality of phase-shifted interference fringe images obtained by, for example, a plurality of different image capturers or in different image capture regions of a single image capturer.

2. Description of Related Art

An interferometer analyzing a phase of interference fringes produced by light reflected from a reference surface and light reflected from a measured object is a device capable of measuring a shape of the measured object with a high degree of accuracy using a wavelength of the light as a measuring stick. A representative technique of analyzing, with a high degree of accuracy, the phase of the interference fringes obtained by the interferometer is a phase-shift interferometer which shifts the phase of the interference fringes and captures and analyzes a plurality of images. Among such phase-shift interferometers, an instantaneous phase-shift interferometer uses a plurality of interference optical paths and a camera to simultaneously measure a plurality of phase-shifted interference fringes required for analysis. The instantaneous phase-shift interferometer is an extremely practical interferometer that is capable of measuring a shape of a measured object in a vibration environment such as an assembly plant, to which conventional phase-shift interferometers are ill suited.

In the instantaneous phase-shift interferometer, errors in analysis of the interference fringe phase are generated by variation in bias and amplitude between the plurality of interference fringe images captured by different cameras, and a difference between a defined value in calculation of a phase shift amount and an effective value achieved optically. Accordingly, optical parameters characteristic of each individual interferometer (i.e., bias, amplitude, and amount of phase shift of interference fringes obtained by each camera) are measured ahead of time, and when the actual measured object is measured, a highly accurate measurement cannot be obtained unless calculations are performed with such optical parameters taken into consideration.

The applicant has disclosed a method of measuring these optical parameters in Japanese Patent Laid-open Publication Nos. 2002-13907 (FIGS. 1 and 3) and 2002-13919 (FIGS. 1 and 2). In these documents, in an instantaneous phase-shift interferometer shown in FIG. 1, a measured object (described as a detected surface 7 in both documents) is shifted $\Delta d_i$ in an optical axis direction with respect to a reference surface 5, as shown in FIG. 2, and a plurality of interference fringes are imaged. Then, by performing data processing using a formula noted in both documents, for example, the optical parameters of the instantaneous phase-shift interferometer can be calculated. In the drawings, 1 is a laser light source, 2 is a lens, 3 is a beam splitter, 4 is a collimator lens, 6 and 8 are ¼ wave plates, 9 is a three-way (splitting) prism, 10 to 12 are polarizing plates, and 13 to 15 are image capture devices.

In order to achieve the previously proposed method, the measured object 7 must be accurately shifted in the optical axis direction with respect to the reference surface 5 of the instantaneous phase-shift interferometer. In order to do this, a costly, extremely high-accuracy scanning stage must be prepared and the measured object 7 must be installed on the stage so as to not move. In addition, vibration in a measurement environment during measurement of the optical parameters may induce a relative shift error of the measured object 7 with respect to the reference surface 5, and therefore an accurate measurement environment eliminating vibration must be prepared.

Because the errors are fixed and characteristic of each individual interferometer, measurement of the optical parameters should theoretically be performed only once after assembly and adjustment of the interferometer. However, in reality, the optical parameters change due to changes to optical devices configuring the interferometer over time, deformation of an interferometer casing holding the optical devices, and the like. Accordingly, measurement must be performed periodically and values updated in order to maintain a high level of performance. Bringing the interferometer to an environment where the measured object 7 can be shifted accurately, and accurately shifting the measured object 7 to measure the optical parameters each time this is done require a great deal of effort.

Specifically, the conventional technique proposed to improve accuracy of an instantaneous phase-shift interferometer requires a special device and special measurement environment, and poses extreme difficulties to a user performing measurement periodically.

SUMMARY OF THE INVENTION

The present invention has been conceived in order to resolve the above-noted conventional issues, and is proposed in order to improve accuracy of an instantaneous phase-shift interferometer. For example, the present invention enables a user to easily pre-measure (calibrate) a bias, amplitude, and amount of phase shift between a plurality of phase-shifted interference fringe images obtained by a plurality of different image capturers or in different image capture regions of a single image capturer.

The present invention addresses the above-noted concerns with an instantaneous phase-shift interferometer splitting a detected light beam into a plurality of light beams or regions, the detected light beam including a reference beam as a measurement reference and a measurement beam obtained by reflecting from or passing through a measured object; relatively shifting a phase difference between the reference beam and the measurement beam, then generating interference fringes and simultaneously capturing a plurality of phase-shifted interference fringe images; and measuring a shape of the measured object. The interferometer uses a light source having a coherence length shorter than a difference in optical path length between the reference beam and the measurement beam. The beam from the light source is split in two and, using a delay optical path having a changeable optical path length, a first beam is delayed to cause a difference in optical path length and is superimposed on the same optical axis as a second beam, after which the reference beam and the measurement beam are generated. The optical path length of the delay optical path is changed during adjustment and a plurality of phase-shifted interference fringe images are individually captured, and at least one of a bias, amplitude, and phase shift amount of the interference fringes obtained in each of the interference fringe images is calculated. During measurement, the shape of the measured object is measured based on at least one of bias calculation results, amplitude calculation results, and phase shift amount calculation results of the interference fringes.

In this example, when the optical path length of the delay optical path is changed during adjustment and a plurality of phase-shifted interference fringe images are individually captured, the measured object can be provided fixated with respect to an interferometer main body.

In addition, the plurality of regions can be rendered as microregions within a unit cell, divided by a micropolarizer.

In the instantaneous phase-shift interferometer according to the present invention, a low coherency light source is used and the delay optical path is provided changing the optical path length difference between the reference beam and the measurement beam. In addition, in order to correct the instantaneous phase-shift interferometer, for example when measuring the optical parameters of the interferometer obtained by a plurality of image capturers or by different image capture regions of a single image capturer, a mirror in the delay optical path is parallel displaced very slightly, the phase of the interference fringes is shifted, and the interference fringes are captured. Then, the optical parameters are calculated from the plurality of phase-shifted interference fringe images obtained by each of the image capturers or image capture regions.

Accordingly, a user can perform pre-measurement (calibration) of the optical parameters simply in an environment where the interferometer is actually used, without using a special device. Thus, time and effort to maintain the performance of the interferometer can be greatly reduced. Therefore, an error generated by a difference in the bias and amplitude between interference fringes obtained by each of the plurality of different image capturers or each of the different image capture regions of the single image capturer, and by a difference between the defined value of the phase shift amount and the effective value achieved optically, can be reduced or eliminated, enabling the shape of the measured object to be measured with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described in detail with reference to the drawings. Moreover, the present invention is not limited by the content described in the embodiments and examples that follow. Configuration requirements in the following embodiments and examples may also include that which is readily conceivable by one skilled in the art, that which is substantially similar, and that which encompasses an equivalent scope. Furthermore, the configuration requirements disclosed in the following embodiments and examples may be combined as appropriate, or may be selectively employed as appropriate.

Figure 1:
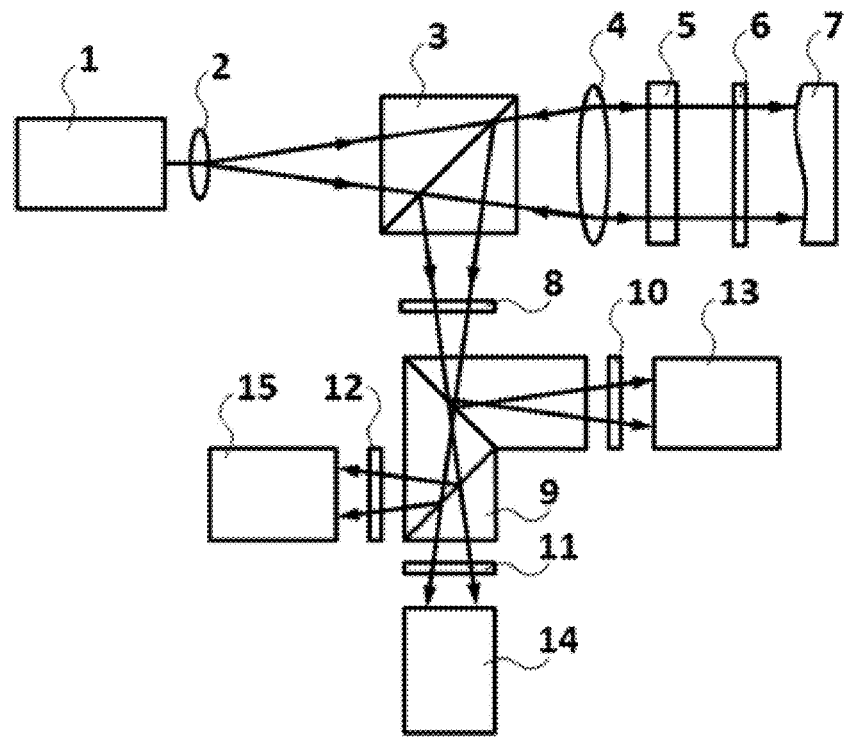
FIG. 1 is an optical path diagram illustrating an exemplary optical configuration of a conventional instantaneous phase-shift interferometer described in Japanese Patent Laid-open Publication Nos. 2002-13907 (FIGS. 1 and 3) and 2002-13919 (FIGS. 1 and 2)
Figure 2:
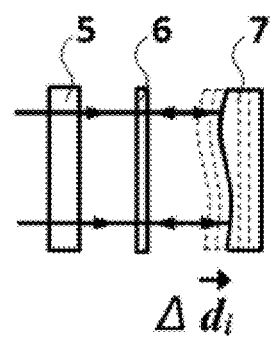
FIG. 2 illustrates a method of measuring a bias, amplitude, and amount of phase shift in the conventional instantaneous phase-shift interferometer.
Figure 3:
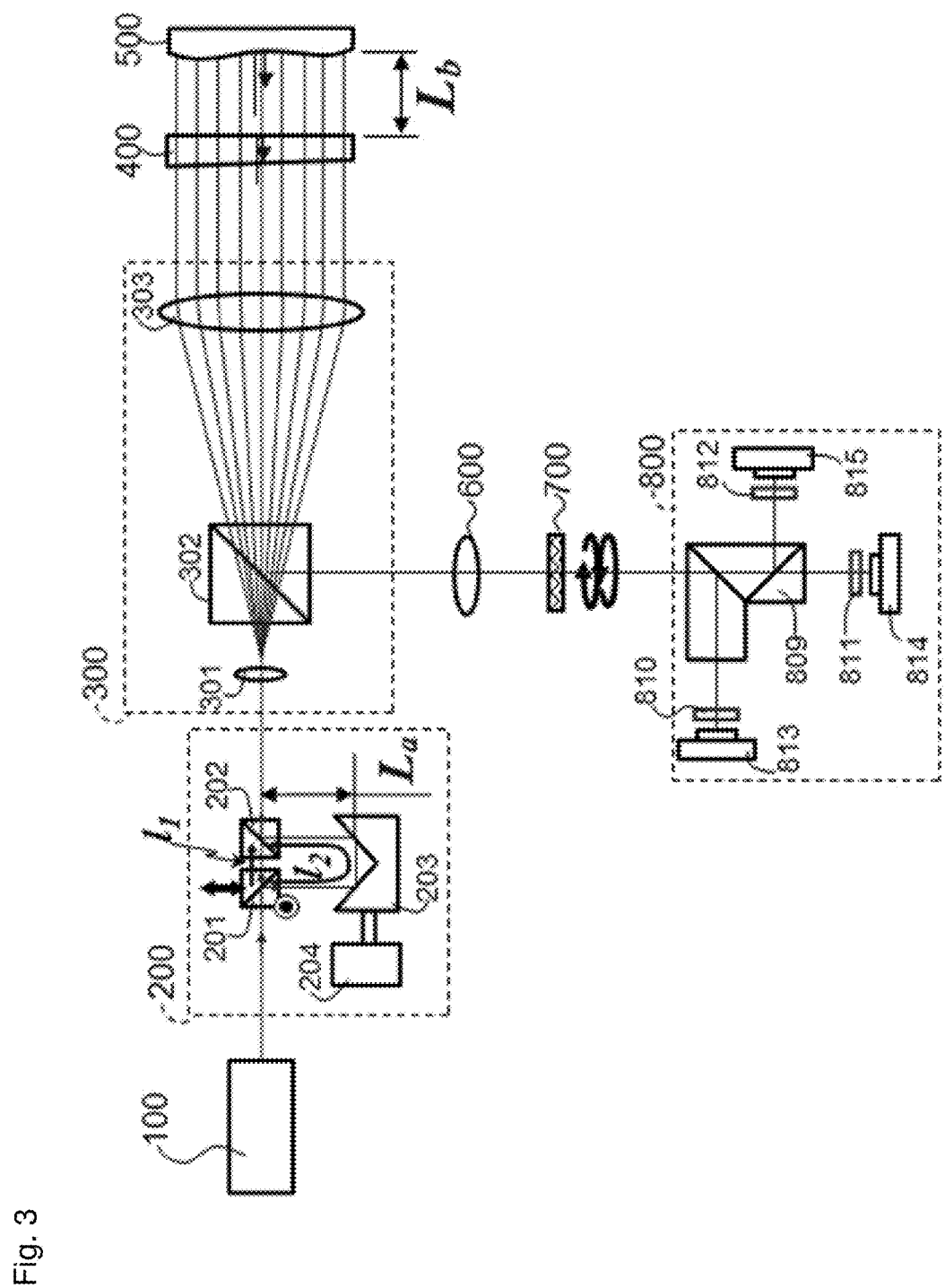
FIG. 3 is an optical path diagram illustrating an optical configuration according to a first embodiment of an instantaneous phase-shift interferometer according to the present invention.

A configuration according to a first embodiment of an instantaneous phase-shift interferometer according to the present invention is shown in FIG. 3. A light beam from a light source 100 is split into two components having orthogonal planes of polarization. In the present embodiment, the light beam is split by a polarizing beam splitter (PBS) 201 into a horizontal polarized beam $l_1$ and a vertical polarized beam $l_2$. A reflected beam of the vertical polarized beam ($l_2$) is reflected and diverted by a rectangular prism 203 serving as a mirror, after which the horizontal polarized beam $l_1$ and the vertical polarized beam $l_2$ are superimposed on each other by a PBS 202. Then, after expansion and collimation by a beam expansion optical system 300 that includes a lens 301, a beam splitter 302, and a lens 303, a reference surface 400 and a surface of a measured object 500 (hereafter referred to as a measured surface) are bombarded, the reference surface 400 and measured surface being positioned on the same optical axis as in a conventional Fizeaur-type interferometer. A detected beam from each surface is extracted from the beam expansion optical system 300 by the beam splitter 302 and passes through an imaging lens 600. Then, the detected beams pass through a λ/4 plate 700, and the horizontal polarized beam $l_1$ and vertical polarized beam $l_2$ are converted to left/right-inverted circularly polarized light, after which the beams and $l_1$ and $l_2$ are incident to an imaging system 800. After the detected beams are split by a three-way splitting prism 809 within the imaging system 800, by positioning polarizing plates 810, 811, and 812 adjusted to different rotations on each of the divided optical paths, a phase difference of light reflected from the measured surface 500 relative to the reference surface 400 becomes visible in interference fringes. Interference fringe images are then captured by three cameras 813, 814, and 815.

In this interferometer, a difference in length $L_a$ of a diverted optical path is made congruent to a difference in length $L_b$ of an optical path of light reflected from the reference surface 400 and the measured surface 500, then a light source having a coherence length $\Delta L$ shorter than the optical path length difference $L_a$ is used as the light source 100. Then, the interference fringe made visible by passing through the polarizing plates 810, 811, and 812 provided on the three-part optical path is generated only by a light beam of the vertical polarized light component of light reflected from the reference surface 400 and the horizontal polarized light component of light reflected from the measured surface 500. In addition, the interference fringe obtained by the three cameras 813, 814, and 815 is an interference fringe in which the phase is shifted in accordance with an installation angle of the polarizing plates 810, 811, and 812 positioned in front of each of the cameras 813, 814, and 815, respectively.

In the following, a method is described of making simple measurements of a bias and amplitude of interference fringe images obtained by each of the three cameras 813, 814, and 815, as well as a phase shift amount between interference fringes, without using special equipment.

Figure 4:
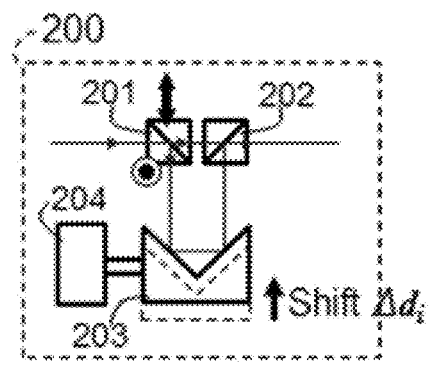
FIG. 4 is an optical path diagram illustrating a state of optical parameters prior to measurement in the first embodiment.

The interference fringe obtained by the interferometer is generated between the vertical polarized beam $l_2$ reflected by the reference surface 400, which has passed through a delay optical path 200, and the horizontal polarized beam $l_1$ obtained by bombarding the measured object 500, without deviation. Accordingly, as shown in FIG. 4, by shifting a position of the rectangular prism 203 up and down in the drawing, and changing a delay amount of the reference light beam ($l_2$) of the delay optical path 200 within the device, the measurement light beam ($l_1$) can be phase-shifted relative to the reference light beam ($l_2$). Under these circumstances, a minor displacement mechanism 204 is added to the rectangular prism 203 of the delay optical path 200, shifting the phase of the interference fringe. Then, the interference fringe images are captured by each of the cameras 813, 814, and 815 and by performing a calculation using a formula given in Japanese Patent Laid-open Publication No. 2002-13907 or Japanese Patent Laid-open Publication No. 2002-13919, for example, optical parameters such as the bias, amplitude, and amount of phase shift between interference fringe images captured by each of the cameras 813, 814, and 815 can be obtained.

Measurement of the optical parameters of the interference fringes captured by each of the cameras 813, 814, and 815 is achieved by an operation of the minor displacement mechanism 204 installed within the device. Therefore, there is no need for a user to separately prepare a high-accuracy displacement stage, enabling anyone to perform displacement simply.

When the rectangular prism 203, such as that shown in the drawings, is used as the mirror of the delay optical path 200, optical axis offset due to yawing or the like of the rectangular prism 203 accompanying minor displacement can be reduced due to the optical properties of the rectangular prism 203. In a conventional case where the measured object 500 is shifted, parallel displacement must be performed accurately in an optical axis direction while a relative posture of the measured surface with respect to the reference surface 400 is kept constant. In comparison, in the method according to the present invention, the minor displacement mechanism 204 required in order to perform phase shifting can be produced more simply.

Next, another aspect of the method of measuring optical parameters such as the bias, amplitude, and amount of phase shift of an interference fringe according to the present invention is described.

In conventional methods, a mechanism shifting the measured object 500 relative to the reference surface 400 is positioned separately from the interferometer. In this case, the interferometer and the measured object 500 require highly independent holders, and a relative shift error occurs for the measured object 500 due to vibration occurring in the measurement environment. Accordingly, when the optical parameters are measured, an accurate measurement environment is sought in which vibration is eliminated.

Figure 5:
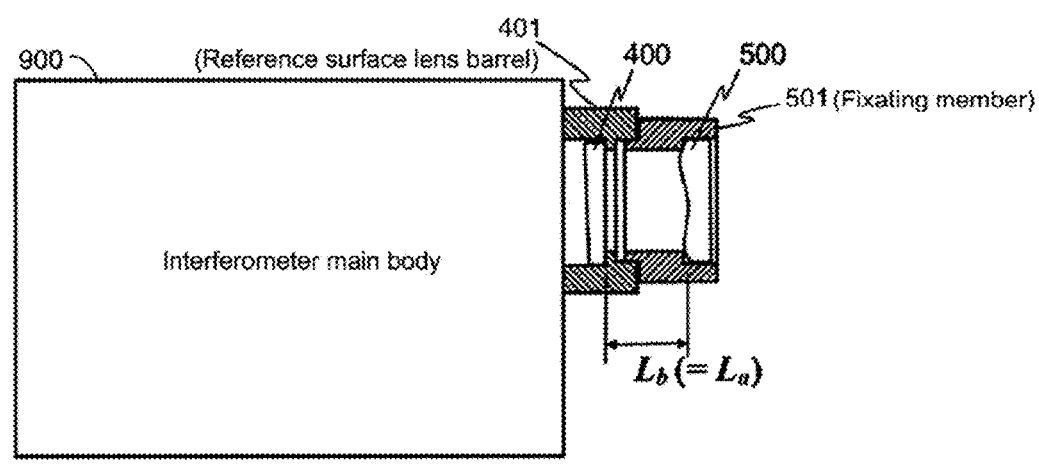
FIG. 5 is a cross-sectional view of relevant portions illustrating a modified configuration of the first embodiment.

In contrast, in the method according to the present invention, the measured object 500 may be provided on an optical path that is fixated with respect to the reference surface 400. Therefore, as exemplified in FIG. 5, the measured object 500 can be positioned firmly fixated by a fixating member 501 (also referred to as a frame) to a lens barrel 401 of the reference surface 400. Accordingly, an interferometer main body 900 and the measured object 500 can be provided so as to be somewhat rigid, and therefore even in an environment such as an assembly plant, measurement can be performed without being subject to the effects of vibration. Specifically, even without deliberately preparing an accurate measurement environment, as in the conventional methods, the method according to the present invention enables measurement of parameters of an interference fringe.

An embodiment in which optical parameters of an interferometer are measured is described above using the example of the Fizeaur-type interferometer. However, the applicable interferometers in the present invention are not limited to this.

So long as the interferometer splits light into two beams (a reference beam and a measurement beam) which interfere with each other, the present invention can be applied no matter the type of interferometer, for example, a Twyman-Green-type interferometer using a beam splitter to split light at roughly 90° into a reference beam and a measurement beam which interfere with each other, or a Mach-Zehnder-type interferometer splitting light into independent optical paths and measuring a transmitted wavefront or the like.

In the exemplary optical configuration of the interferometer shown in FIG. 3, an example is shown in which the delay optical path 200 uses the rectangular prism 203 and the polarizing beam splitters 201 and 202. However, the present invention is not limited to this configuration and so long as the delay optical path cancels out the difference in optical path length between the reference beam and the measurement beam, any configuration may be used. For example, as in a modification 210 shown in FIG. 6, a configuration is possible which assembles a PBS 211, $\lambda/4$ plates 212 and 214, and plane mirrors 213 and 215, and in which a delay is caused between the transmitted light and reflected light at the PBS 211. In such a case, one or both of the mutually facing plane mirrors 213 and 215 (in FIG. 6, only the plane mirror 213) displace in the optical axis direction, thereby yielding a shift amount $\Delta d_t$ similar to that shown in FIG. 4.

Figure 6:
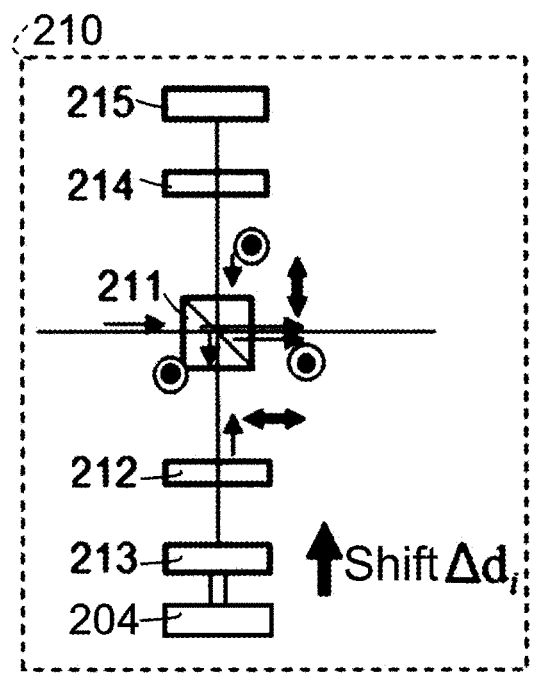
FIG. 6 is an optical path diagram illustrating a modification of the delay optical path according to the first embodiment.

In addition, the mirror used to cause the delay is not limited to the rectangular prism 203 and plane mirrors 213 and 215 shown in the examples of FIGS. 3, 4, and 6. Instead, any element capable of reflecting light can be used, such as a retroreflector or cat's-eye.

Figure 7:
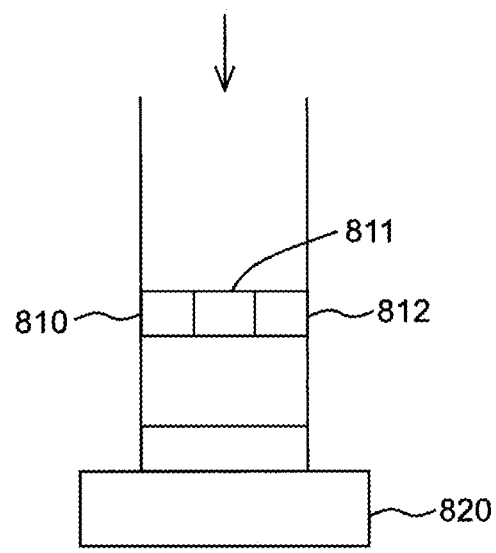
FIG. 7 is an optical path diagram illustrating a configuration of relevant portions according to a second embodiment of an instantaneous phase-shift interferometer according to the present invention.
Figure 8:
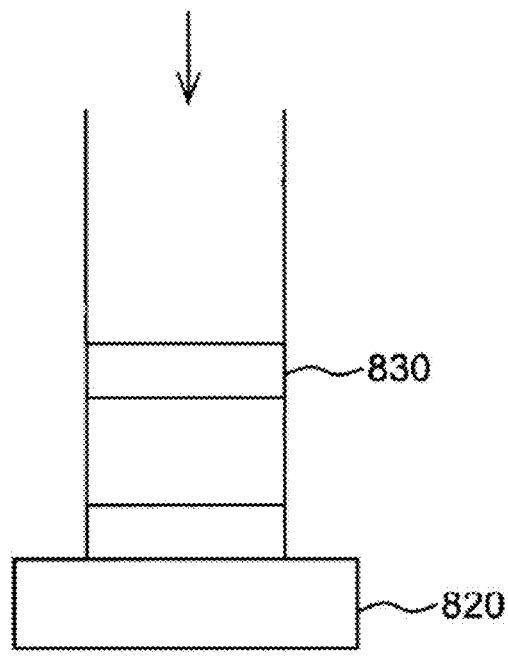
FIG. 8 is an optical path diagram illustrating a configuration of relevant portions according to a third embodiment of an instantaneous phase-shift interferometer according to the present invention.
Figure 9:
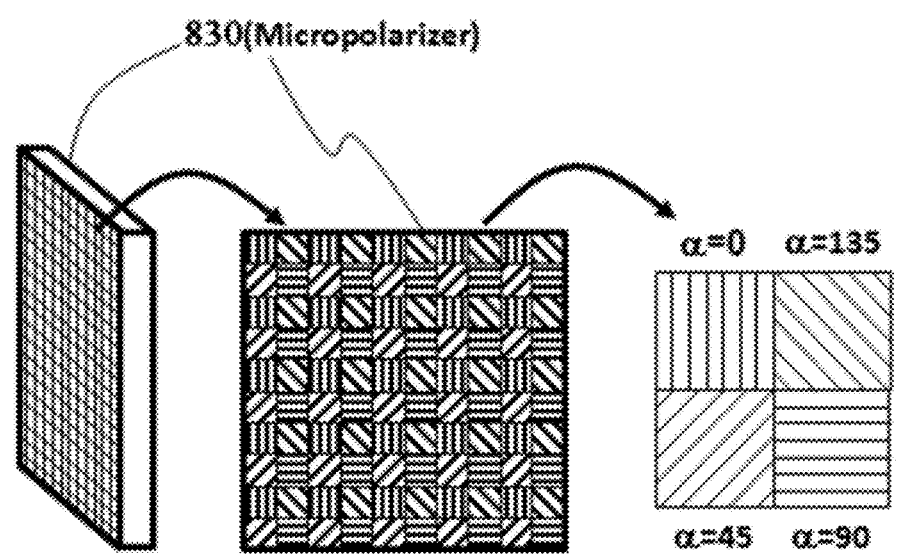
FIG. 9 is an explanatory view of an exemplary polarizing plate used in the third embodiment.

Moreover, the number of cameras is not limited to three. So long as a plurality of images can be obtained simultaneously, an image capture region of a single camera 820 which is split into three camera regions may be used, as in a second embodiment, relevant portions of which are shown schematically in FIG. 7. Alternatively, as in a third embodiment, relevant portions of which are shown schematically in FIG. 8, and as shown in FIG. 9, in accordance with a pixel size of the camera, a micropolarizer (also referred to as a polarizer array) 830 may be used which is a polarizing plate having microregions corresponding to the polarizing plates 810, 811, and 812 formed within a single cell, and a phase-shifted interference fringe may thereby be obtained by a single camera 820 without splitting the light beam.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An instantaneous phase-shift interferometer splitting a detected light beam into a plurality of light beams, the detected light beam including a reference beam as a measurement reference and a measurement beam obtained by one of reflecting from and passing through a measured object, relatively shifting a phase difference between the reference beam and the measurement beam, then generating interference fringes and simultaneously capturing a plurality of phase-shifted interference fringe images, and measuring a shape of the measured object, the interferometer comprising:
   a light source having a coherence length shorter than a difference in optical path length between the light reflected from a reference surface and the light reflected from a surface of the measured object;
   a frame configured to fix the measured object directly to the reference surface;
   a beam splitter configured to split the beam from the light source;
   a plurality of cameras configured to individually capture a respective plurality of phase-shifted interference fringe images; and
   a delay optical path having a changeable optical path length and configured to delay a first beam to cause a difference in optical path length, wherein the beam splitter is configured to superimpose the first beam on the same optical axis as a second beam, after which the reference beam and the measurement beam are generated, the delay optical path comprising:
      a first and second mirror;
      an actuator configured to change the optical path length of the delay optical path by displacing the first minor during adjustment of the delay optical path; and
      a first and second wave plate positioned on opposing sides of the beam splitter and between the first and second mirrors.

2. The instantaneous phase-shift interferometer according to claim 1, wherein when the optical path length of the delay optical path is changed by the actuator during the adjustment of the delay optical path, and the plurality of the phase-shifted interference fringe images are individually captured by the plurality of cameras, the measured object is fixed with respect to an interferometer main body.

3. The instantaneous phase-shift interferometer according to claim 1, wherein the plurality of light beams is divided into a plurality of microregions within a unit cell by a micropolarizer.

4. The instantaneous phase-shift interferometer according to claim 2, wherein the plurality of light beams is divided into a plurality of microregions within a unit cell by a micropolarizer.

5. The instantaneous phase-shift interferometer according to claim 1, wherein the second mirror is displaced during adjustment of the delay optical path.

* * * * *

UNITED STATES PATENT AND TRADEMARK OFFICE
CERTIFICATE OF CORRECTION

PATENT NO. : 10,088,291 B2
APPLICATION NO. : 15/190912
DATED : October 2, 2018
INVENTOR(S) : K. Kawasaki et al.

Page 1 of 1

It is certified that error appears in the above-identified patent and that said Letters Patent is hereby corrected as shown below:

In the Claims

Column 8, Line 25 (Claim 1, Line 32), please change "minor" to --mirror--.

Signed and Sealed this
Nineteenth Day of February, 2019

Andrei Iancu
*Director of the United States Patent and Trademark Office*